United States Patent Office 3,384,241
Patented May 21, 1968

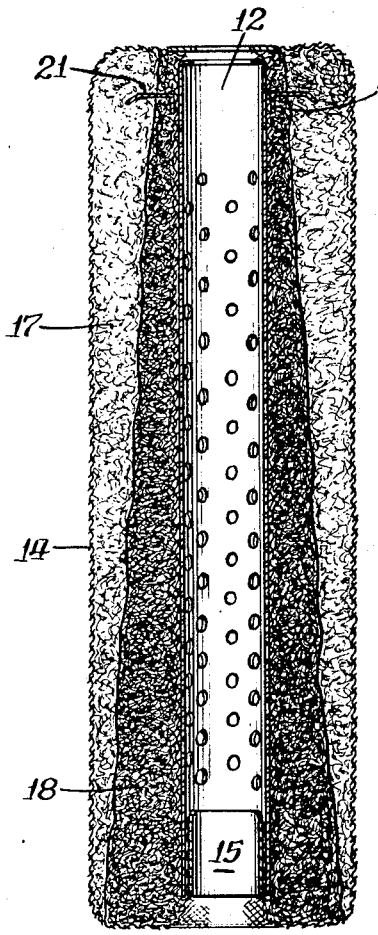
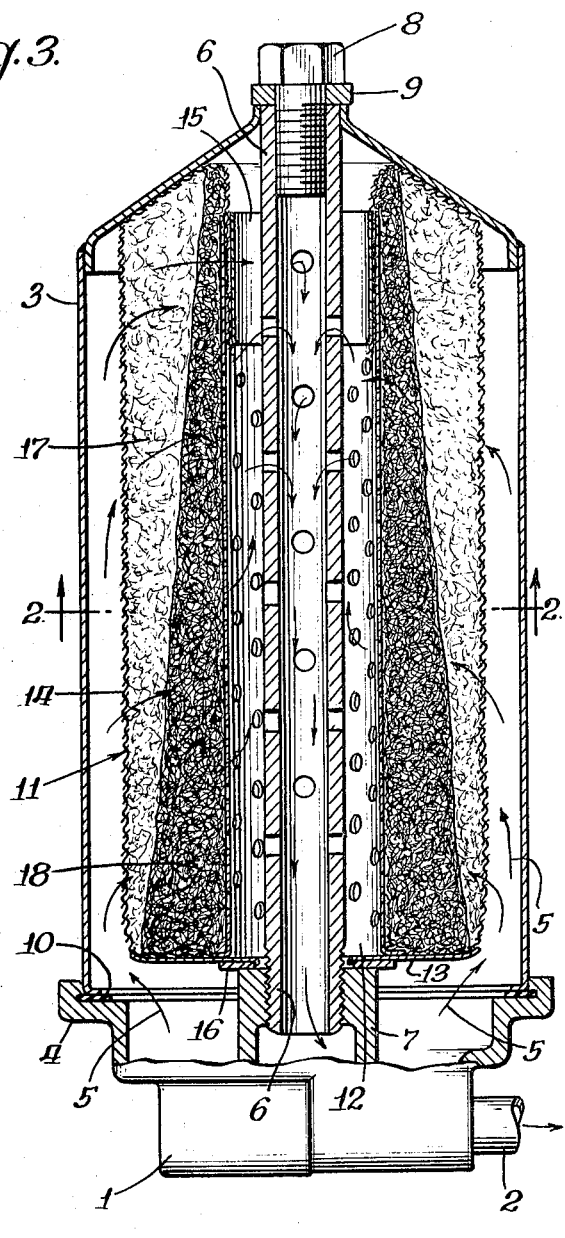

3,384,241
GRADUATED DUAL DENSITY LIQUID
FILTER ELEMENT
William G. Nostrand, Stoughton, Wis., assignor to Nefco Filter Corporation, Stoughton, Wis., a corporation of Wisconsin
Filed Jan. 12, 1966, Ser. No. 520,179
10 Claims. (Cl. 210—315)

ABSTRACT OF THE DISCLOSURE

A liquid filter, especially for oil in internal combustion engines, has layers of coarse and fine filtering media, the fine media layer varying in thickness to provide a low flow resistance portion through which temporarily viscous liquid may pass with otherwise normal filtration.

---

This invention relates to filters for liquids for the removal of solid and semisolid particles and more particularly to an improved filtering element structure which, while useful for the filtration of liquids generally, is particularly advantageous for the filtration of oils and similar hydrocarbon liquids which vary in viscosity as the temperature varies.

The most desirable liquid filter is one which removes a maximum amount of particles, including very fine particles, with a minimum resistance to flow of the liquid through the filtering media and with adequate capacity to provide a useful life of reasonable duration. The employment of a relatively coarse media permits ready flow of liquid through the element but serves to remove only the coarser particles. Employment of a relatively fine media accomplishes the removal of relatively fine particles, but the useful life of such an element is unduly limited by the clogging of the surface and consequent resistance to liquid flow.

Filtering elements comprising both coarse and fine media through which the liquid is caused to flow in series, first through the coarse and finally through the fine media, are known. Such elements are effective in that the coarser particles are loaded into the coarser media and only the finer particles are left for removal by the final finer media.

A special problem is involved in the filtration of oil which varies in temperature and therefore viscosity as, for example, in the lubricating systems of internal combustion engines. A filtering element designed to operate effectively in the removal of particles when the oil is warm and readily flows through the media offers so much resistance to the flow of cold, viscous oil that it is necessary to bypass the filter to insure a continuing supply of lubricating oil to moving parts until the oil is warmed sufficiently to flow through the filter. While this expedient is commonly used and is necessary to avoid damage to bearings due to inadequate oil supply, it does involve an undesirable comprise in that unfiltered oil carrying particles which are damaging, albeit to a lesser degree, is supplied to the bearings while the system is warming up. To minimize the consequences of this undesirable aspect of the bypassing expedient, filtering elements have been provided which comprise coarse and fine media arranged in parallel with respect to the flow of the oil so that even when the oil is cold, it will at least pass through the coarse media. However, this results in the removal of only the coarser particles, leaving the finer particles in the oil as it is supplied to the bearings.

The principal object of this invention is to provide a liquid filtering element comprising both fine and coarse media arranged in such a way that the resistance to flow of liquid through the media varies at differing locations as, for example, from one end to the other, so that the filter is capable of accommodating the requirements of flow dictated by the needs of the bearings to be served by the oil, at all times providing fine media filtration. Thus, the invention contemplates a system of liquid filtration which permits the flow of even cold, viscous oil while removing even the finer particles.

A further object is to provide a filtering element having high capacity and, therefore, long useful life. Another object is to provide improved means for sealing the filtering element in its housing to insure against the undesired bypassing of liquid at the areas of juncture of the element with the housing.

The construction and mode of operation of the filtering element of the invention will be more fully understood from the following description in conjunction with the accompanying drawing in which:

FIG. 1 is a cross-sectional view of a typical liquid filter housing containing the filtering element of the invention;

FIG. 2 is a cross-sectional view taken at the line 2—2 of FIG. 1, and

FIG. 3 is a cross-sectional view of a filtering element embodying the invention and illustrating an improved seal structure at one end of the element.

Although the filter structures with which this invention is concerned may be mounted and used in any position, not necessarily being oriented in vertical position as illustrated in FIGS. 1 and 3 of the drawing, for the sake of convenience and clarity of description, reference may be made hereinafter to the top or bottom of the housing or filtering element meaning, of course, the top and bottom as the structures are oriented in the drawing. Also, while, as noted above, the improved filtering element is useful for the filtration of liquids generally, the invention realizes its greatest advantage in the filtration of oil and the exemplary embodiments will be described as units employed in the lubricating oil systems of engines.

The housing of the filter illustrated in FIG. 1 is of known construction. It comprises a base 1 having an outlet 2 for filtered oil, a suitable inlet, not shown, and oil flow passageways. This base serves to support a housing 3 upon circular flange 4 which defines the upwardly facing mouth of the base which opens into the interior of housing 3 to supply unfiltered oil as indicated by arrow 5. A center tube 6 is threaded into a spud 7 which is a centrally located integral part of base 1. Thus, center tube 6 provides a post for supporting housing 3 by means of a cap screw 8 which is screwed into the top end of tube 6 to clamp the housing between a copper gasket 9 and a fiber gasket 10 to provide a complete enclosure for the filter unit.

The usual bypass valve may be provided within base 1 to permit the direct flow of unfiltered oil to outlet 2 in the event of insufficient flow through the filtering element, this being the usual practice.

The filtering element, constructed in accordance with the invention and designated generally by the numeral 11, is also clamped in position by housing 3. The element comprises a supporting inner tube 12, usually metal, which is perforated, as shown, to provide an open area for the flow of oil through the tube walls of at least, preferably, 40%. A broad washer 13 is welded to the bottom of tube 12 to provide a support for the bottom end of the filtering media. The filtering media itself is contained within a suitable oil-permeable fabric 14 as, for example, knitted cotton tubing. A short length 15 of rigid tubing locks the end of the fabric in place inside of the top end of perforated tube 12. If desired, this length of tubing may be perforated. A gasket 16 is provided to prevent leakage between the bottom washer 13 and the top of spud 7 when the housing 3 is forced downwardly to seal the filtering element into position. The seal between the top of the filtering element and housing 3 is effected by the resilience of the filtering media and the pressure applied by the housing as cap screw 8 is tightened.

The body of filtering element 11 is composed of filtering media having two different densities or degrees of coarseness. The media bodies are arranged concentrically with coarse media 17 around and outside of the fine media body 18. With this arrangement, the oil to be filtered flows first through the coarse media and then through the fine media before the filtered oil passes through the perforations of center tube 12. It will be understood that the filtered oil will pass through the openings 19 in the walls of center tube 6 and thence into base 1 and out through the filter outlet 2.

In accordance with the novel feature of the invention, the thickness of the fine media body 18, which principally determines flow resistance of the element and, therefore, principally controls the pattern of flow therethrough, varies at different sections of the filtering element. In the particular example illustrated, the thickness varies from a minimum at the top of the filtering element to a maximum at the bottom, the thickness diminishing more or less uniformly from top to bottom. In the element shown by way of example, the course media body 17 also varies in thickness, the greatest depth of media being at the top of the element and the smallest depth being at the bottom. Since the coarse media offers substantially less resistance to the flow of oil through it than does the finer media, it will be understood that resistance to flow in the element illustrated is greatest at the bottom of the element and decreases progressively toward the top of the element.

The density of the coarse media and the density of the fine media used in the construction of the filtering element, and their densities relative to each other, are such that under the conditions of use of the filtering unit, an adequate, minimized quantity of oil will flow through the element to the bearings when the oil is cold and at maximum viscosity. Stated differently, the element is designed to permit the flow of the minimum amount of oil to the bearing under the conditions of the intended use, including pressure supplied by the oil pump, the maximum viscosity of the oil, with not more than an acceptable loss of pressure due to flow through the element. Maximum flow of the cold oil will take place, of course, at the top of the element since the resistance at this location is minimum. As the temperature of the oil increases and the viscosity correspondingly diminishes, more of the oil will flow through the filtering element until, when maximum temperature is attained, the optimum quantity of oil will flow readily through the filter for steady operation of the engine.

From the foregoing, it will be understood that to attain a principal objective of the invention; namely, the passage of an adequate amount of oil through the filtering element under all conditions of use and removal of at least a substantial portion of the fine particles, as well as the coarse particles, the fine media body 18 must extend throughout the length of the element. Because the efficiency of the removal of fine particles increases, within limits, with the thickness of the filtering media, the upper portion of the element will be less efficient for the removal of fine particles; that is, the thinner portions of the media will hold on to a smaller portion of the particles carried by the oil. This represents a compromise made in the interest of maximum filtration efficiency and length of service life of a given element under all operating conditions, it being recognized that it is preferable to supply oil containing a minimal proportion of fine particles to the bearings rather than bypass dirty oil directly to the bearings or to supply oil from which only the coarse particles have been removed.

It should also be appreciated that since the principal function of the coarse media is to remove the coarse particles to prevent premature clogging of the fine media, it is not an indispensible condition to the intended operation of the filtering element of this invention that the coarse media body 17 extend all of the way to the bottom of the element. The only adverse effect of the direct exposure of the fine media to the incoming oil at the lowermost portion of the filtering element is to deprive this portion of the element from protection against clogging by the coarse particles. It is preferable, however, that the element be constructed as illustrated with the coarse media entirely covering the inner layer of fine media because this prevents the premature complete clogging of any portion of the fine media.

Since the fine media offers substantially greater resistance to the flow of oil than does the coarse media, the flow pattern of the oil through the element will be primarily determined by the thickness of the fine media rather than by the coarse media. It follows that for the purpose of the invention the thickness of the layer of coarse media may be uniform throughout the length of the element. Such a body of uniform thickness would serve the function of trapping the coarse particles without interfering in any way with the intended flow pattern which represents the advantages of the invention.

Various materials may be used for the two types of filtering media. For example, the coarse media may comprise a uniform mixture of 80% wood excelsior and 20% cotton waste while a mixture of 50% wood excelsior and 50% cotton waste may be used for the fine media. Since the flow resistance of the media depends upon the density to which it is packed, the densities of the respective media will be established by the resistance limitations dictated by the conditions of use of the filter.

The filtering element illustrated in FIG. 3 is essentially the same as that illustrated in connection with FIG. 1 and the same reference numerals designate corresponding parts. The only essential difference resides in the provision of a rigid collar 20 which surrounds inner tube 12 and the textile fabric layer at a point slightly below the top of the element. This collar includes a radially extending flange 21 which provides support for the portion of media above the flange when pressure is applied by the by the filter housing to the top of the element. The desired result is a more certain seal at the juncture of the top of the element and the filter housing.

In the operation of filtering elements made in accordance with this invention, the element loads gradually with the pattern of flow shifting with respect to the length of the element as flow resistance is increased due to loading at particular locations. This shifting of the flow pattern is desirable because it provides an automatic adjustment which results in a gradual increase in pressure drop across the element and increased useful service life. In the particular form of filtering elements illustrated in the drawing and described above by way of example, the rate of flow increases progressively from the bottom to the top of the element.

It will be understood from the foregoing that the low resistance segment of the filtering element may be located at the bottom or somewhere between the top and bottom of the element instead of at the top as illusrated in the drawing and above described. The essential structural features which characterize the invention reside in the provision of fine filter media throughout the length of the element and downstream from the coarse media, the thickness of the fine media varying to provide a segment offering low flow resistance to permit a minimum adequate flow of cold, viscous oil through the element. It will also be understood that while the filtering element is conveniently made in hollow cylindrical form and is so illustrated and described herein, the invention may be embodied in other forms.

Invention is claimed as follows:

1. A filtering element for liquids comprising coarse filtering media and fine filtering media arranged in series with the fine media downstream from the coarse media, said fine media spanning the entire cross section of the element whereby liquid flowing through said element must flow through said fine media, a portion of said span of fine media being thinner than the balance thereof to provide a path of flow through said portion of lower flow resistance than that of the balance of said span of fine media.

2. A filtering element in accordance with claim 1 wherein the span of the coarse filtering media is substantially coextensive with that of the fine media whereby all liquid flowing through said element must flow through said coarse media before flowing through said fine media.

3. A filtering element in accordance with claim 1 wherein the thickness of the coarse media varies and the thickest portion of the span of coarse media is arranged at the location of the thin portion of the fine media.

4. A filtering element in accordance with claim 1 wherein the thickness of the span of fine filtering media varies progressively from the thinnest portion to the thickest portion thereof.

5. A filtering element in accordance with claim 1 wherein said element is in the form of a hollow cylinder and the fine media is inside of the coarse media and the fine media extends throughout the length of the cylindrical element.

6. A filtering element in accordance with claim 5 wherein the thickness of the fine filtering media increases progressively from one end of the element to the other.

7. A filtering element in accordance with claim 5 and including a rigid perforated tube extending throughout the length of said hollow cylindrical element along the inner surface of the fine filtering media and a rigid collar arranged upon said tube in spaced relation to an end of said element, said collar having a radially extending flange adapted to provide support for the media between said collar and said end of said element when sealing pressure is applied to said end of said element.

8. In a liquid filter including a cylindrical housing mounted upon a base having an inlet which opens into the interior of the housing and a perforated center tube extending axially through the interior of the housing and connecting with an outlet in the base, a cylindrical filtering element interposed between the center tube and the housing as a partition therebetween, said element comprising an outer layer of coarse filtering media and an inner layer of fine filtering media, both of said layers extending substantially throughout the length of said element, said layer of fine media being thin at one end of said element and thick at the other end and progressively increasing in thickness from said one end to the other end.

9. Structure in accordance with claim 8 wherein the element is oriented with the thinner fine media remote from the inlet in the base of the filter.

10. Structure in accordance with claim 9 wherein the layer of coarse filtering media varies progressively in thickness from a thick layer at the said one end to a thin layer at the said other end.

References Cited

UNITED STATES PATENTS

| | | | |
|---|---|---|---|
| 1,981,307 | 11/1934 | Burhans | 210—484 |
| 2,041,366 | 5/1936 | Moran et al. | 210—484 X |
| 2,286,434 | 6/1942 | Myers et al. | 210—489 X |
| 2,345,848 | 4/1944 | Winslow et al. | 210—484 X |
| 2,559,267 | 7/1951 | Winslow et al. | 210—133 |
| 2,850,168 | 9/1958 | Nostrand | 210—295 |

FOREIGN PATENTS 604,393   8/1960   Canada.

REUBEN FRIEDMAN, *Primary Examiner.*

F. SPEAR, *Assistant Examiner.*